United States Patent [19]

Bjorkholm et al.

[11] 4,375,033
[45] Feb. 22, 1983

[54] UNIVERSAL DETECTOR FOR ATOMIC AND MOLECULAR BEAMS

[75] Inventors: John E. Bjorkholm, Holmdel; Jonathan C. White, Lincroft, both of N.J.

[73] Assignee: Bell Telephone Laboratories, Incorporated, Murray Hill, N.J.

[21] Appl. No.: 241,718

[22] Filed: Mar. 9, 1981

[51] Int. Cl.³ ............... G01D 18/00; G12B 13/00; B01D 59/44; H01J 49/40
[52] U.S. Cl. .................................. 250/251; 250/286
[58] Field of Search ............... 250/251, 252, 282, 286

[56] References Cited

PUBLICATIONS

"An Ionization Gauge for the Detection of Molecular Rays", *Review of Scientific Instruments*, vol. 6, Nov. 1935, p. 371.

Ramsey, N. F., *Molecular Beams*, Clarendon Press, 1956, pp. 374–393.

*Primary Examiner*—Alfred E. Smith
*Assistant Examiner*—Jack Berman
*Attorney, Agent, or Firm*—Daniel D. Dubosky

[57] ABSTRACT

An atomic or molecular beam detector is disclosed wherein the beam to be detected is coupled through a chopper to form a spatially modulated beam which is then directed at the pressure sensitive surface of a small sensitive microphone. The electrical output signal of this microphone is coupled to a phase-sensitive detector in order to detect the energy that is present in the signal at the frequency corresponding to the chopping rate. In the specific embodiment disclosed, a light beam is also coupled through the chopper in order to develop a second electrical signal which is mixed with the electrical output of the microphone and then coupled through a low pass filter to provide a DC signal when the atomic or molecular beam is present.

6 Claims, 2 Drawing Figures

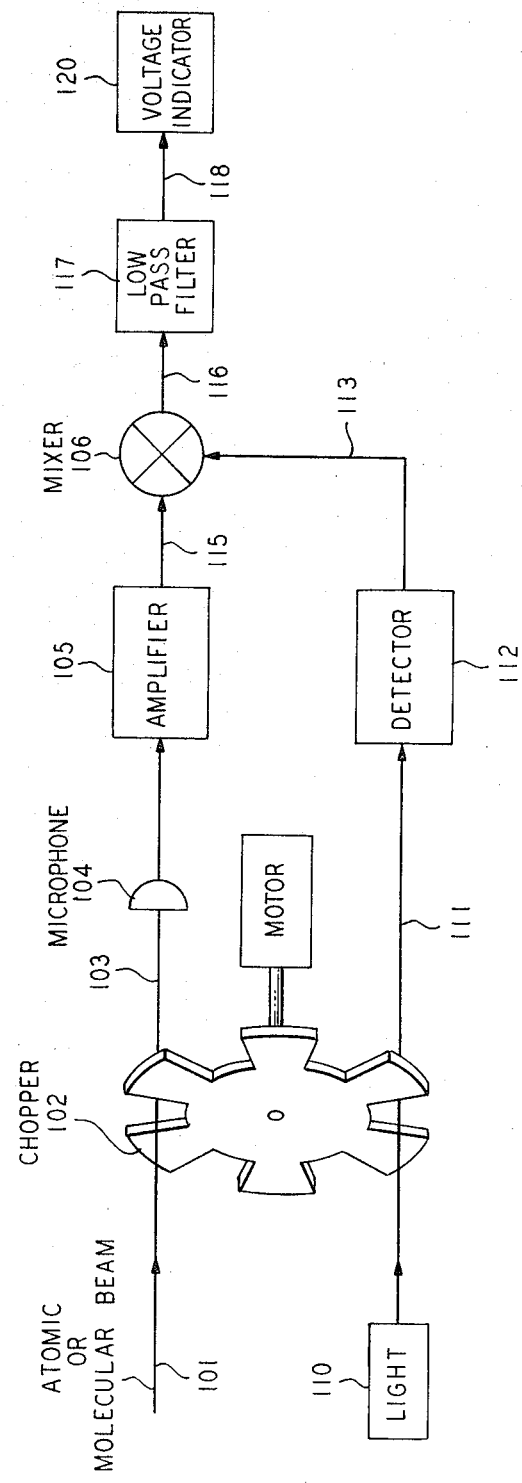

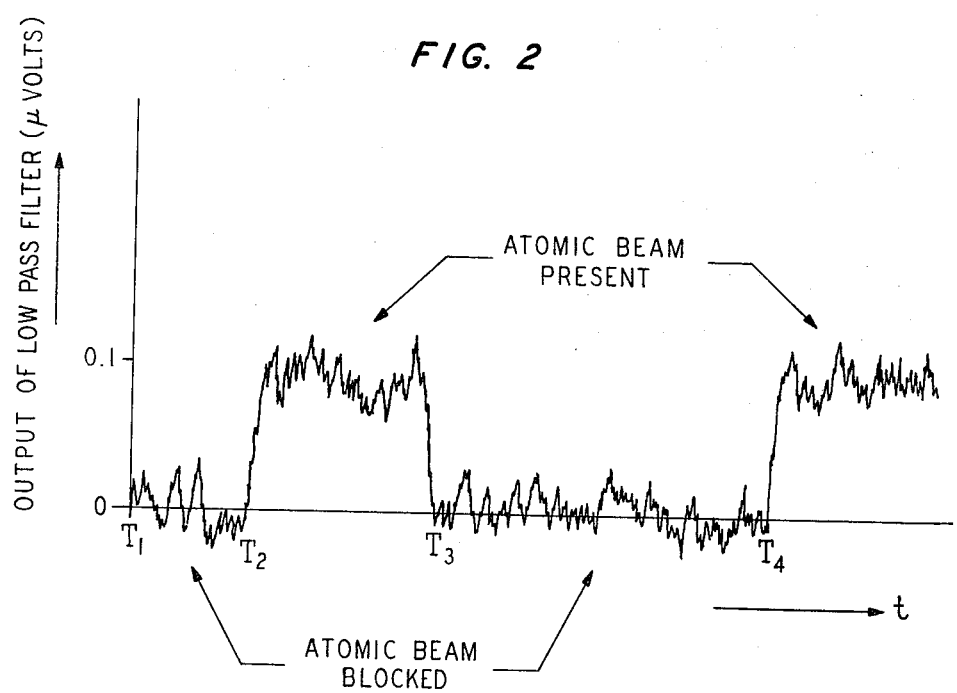

UNIVERSAL DETECTOR FOR ATOMIC AND MOLECULAR BEAMS

BACKGROUND OF THE INVENTION

This invention relates to an atomic and molecular beam detector that is universal in the sense that it is useful with all particles that have mass including those that do not readily ionize.

Various types of detectors are used in the prior art to detect the presence of atomic and molecular beams. A large number of these detectors require ionization of the beam particles. In one form of ionization detector known as the surface-ionization detector, the atom or molecule is caused to strike a heated wire thereby causing the particle to be ionized. Once the particle is ionized, it can be measured in any one of several different ways including current measurement with a sensitive electrometer, current measurement with the aid of an electron multiplier tube and electronic counting with an electron multiplier tube. The surface ionization detector is useful, however, only with easily ionizable elements, such as the alkalai metals, and is not useful in detecting the presence of beams that are composed of molecules and atoms of hydrogen, helium and other type elements that cannot be easily ionized.

Still another form of ionization detector is known to the art as an electron-bombardment ionizer. In this type of detector a high energy electron beam is directed at the element or molecule to be detected and the resulting ionized particle is detected and identified by means of a mass spectrum analyzer. This form of ionization detector is much more versatile than the surface-ionization detector, but it is also much more complicated, more expensive, and not as sensitive.

One type of detector used in the prior art to detect beams that cannot be surface ionized is the Stern-Pirani detector. In this detector, the beam is caused to enter a channel that leads to a small volume chamber containing a hot wire. The channel is ordinarily long and narrow to increase the outward flow resistance of the gas in the chamber so a higher equilibrium pressure can be achieved. Several chambers are utilized and the wires in these chambers are usually arranged in a bridge circuit in order to detect small changes in the resistance of the hot wire. The cooling of the wire in each chamber arises primarily from gaseous conduction and thermal radiation. The gaseous conduction, in turn, is dependent on the pressure in the chamber. By admitting the beam to one of the chambers, the pressure in this chamber is increased thereby causing a small change in the resistance of the corresponding wire which can be detected as an indication that the beam is present. This Stern-Pirani type detector requires careful temperature control and a rather precision block containing the chambers. A much simpler apparatus would be desirable to detect the presence of all types of atomic and molecular beams.

SUMMARY OF THE INVENTION

In accordance with the present invention, the atomic or molecular beam to be detected is chopped to form a spatially modulated beam which is then directed at the pressure sensitive surface of a small sensitive microphone. The electrical output of this microphone is coupled to a phase-sensitive detector in order to detect energy in the electrical output of the microphone at the frequency corresponding to the chopping rate.

In the particular embodiment described, the phase-sensitive detector utilizes a mixer which has one input connected to receive a filtered output of the microphone and a second input connected to the output of a light detector. This light detector is oriented to receive the beam of a light source which is also chopped at the same rate as the atomic or molecular beam. The presence of a DC component in the output of the mixer indicates that an atomic or molecular beam is present.

BRIEF DESCRIPTION OF THE DRAWING

The invention will be more readily understood after reading the following detailed description in conjunction with the drawing wherein:

FIG. 1 is a schematic block diagram of an apparatus constructed in accordance with the present invention, and FIG. 2 is a graph of voltage versus time obtained when using the apparatus illustrated in FIG. 1 to detect an atomic beam of sodium.

DETAILED DESCRIPTION

The atomic or molecular beam to be detected is illustrated as beam 101 in FIG. 1. As shown in FIG. 1, this beam is oriented so as to pass through the rotating slots of a chopper 102 thereby producing a spatially modulated beam 103. A microphone 104 is positioned so as to present its pressure-sensitive surface to the spatially modulated beam 103. In the present embodiment, an electret-condenser type microphone available as Model No. BT-1834 from Knowles Electronics, Inc., Franklin Park, Illinois, was used.

The electrical output of microphone 104 is coupled to an amplifier 105 which may include either a low pass or bandpass filter. The filter with an amplifier 105 should, of course, pass the electrical energy whose frequencies correspond to the chopping rate with minimum attenuation. The small pressure senstive surface of microphone 104 will also be exposed to pressure variations introduced by the gasses that surround the microphone. For this reason, the area of the pressure sensitive surface should ideally be no larger than necessary in order to receive the full diameter of the spatially modulated atomic or molecular beam 103. Some of the extraneous noise introduced by this gas pressure is reduced by the low pass or band pass filter within amplifier 105.

The electrical output of amplifier 105 is coupled by way of line 115 to one input of a mixer 106. A second input of mixer 106 is provided with a signal on line 113 having the same frequency as the frequency that corresponds to the chopping rate of chopper 102. In the present embodiment, this second electrical signal is provided by directing a light source 110 so that its output beam 111 is caused to pass through a slotted area of chopper 102 before impinging on the light sensitive surface of a detector 112. The output of detector 112 thereby provides the second signal to mixer 106 by way of line 113.

Since the light source is always present, the signal on line 113 at the second input of mixer 106 will always be present. The signal at the output of amplifier 105 that is coupled to the first input of mixer 106 will be present, however, only when an atomic or molecular beam is coupled to the pressure sensitive surface of microphone 104. When both signals are present, mixer 106 will produce at its output on line 116 an electrical signal having frequency components at DC and at a frequency corresponding to twice the chopping rate. The signal on line 116 is coupled to the input of a low pass filter 117 which provides at its output on line 118 a DC signal whose amplitude is an indication of the presence of the DC component at the output of mixer 106. This DC signal on line 118, in turn, can be used to provide a visual indication to the operator by way of a voltage indicator 120 which can consist of any one of several types of visual indicating devices such as a meter or chart recorder.

In the embodiment which was constructed to detect an atomic beam of sodium, chopper 102 was caused to rotate so as to produce a chopping frequency in the atomic beam 101 and light from source 110 of approximately 500 Hz. Microphone 104 was positioned at a distance of approximately 15 cm from chopper 102. The atomic beam of sodium had a beam density of about $3 \times 10^9$ atoms/cm$^3$ and an average atomic velocity of about $9 \times 10^4$ cm/seconds. With this beam density and atomic velocity, a beam intensity of about $3 \times 10^{14}$ atoms/cm$^2$ sec was achieved. The output of a chart recorder used as voltage indicator 120 is shown in FIG. 2. Initially, the atomic beam of sodium was completely blocked by means not shown in FIG. 1 and prevented from passing through chopper 102. As indicated in FIG. 2 during the interval between $T_1$ and $T_2$ this resulted in a signal from the chart recorder having an average voltage level of approximately equal to 0. At the time indicated as $T_2$ in FIG 2, the blocking means was removed and the atomic beam of sodium was permitted to pass through chopper 102. This resulted in an output from integrator 117 of approximately 0.1 microvolts as indicated in FIG. 2 between the intervals of $T_2$ and $T_3$. At the time interval indicated as $T_3$ in FIG. 2, the atomic beam of sodium was again blocked from entering the apparatus and the blocking means was again removed at the time designated as $T_4$ in FIG. 2.

What has been described hereinabove is an illustrative embodiment of the present invention. Numerous departures may be made by those skilled in the art without departing from the spirit and scope of the present invention. For example, the second signal coupled by way of line 113 to the input of mixer 106 may be provided by a countdown circuit where the chopper 102 is a synchronous mechanism driven by a quartz oscillator and digital divider.

What is claimed is:

1. Apparatus for detecting the presence of an atomic or molecular beam comprising chopper means for interrupting said atomic or molecular beam at a predetermined rate in order to produce a spatially modulated beam, microphone means having an electrical output and a pressure-sensitive surface that is oriented to receive said spatially modulated beam, means for detecting the presence of energy in said electrical output at a frequency corresponding to said predetermined rate.

2. Apparatus for detecting the presence of an atomic or molecular beam as defined in claim 1 wherein said microphone means includes an electret-condenser type microphone.

3. Apparatus as defined in claim 1 wherein said means for detecting includes mixer means having two inputs and an output, one of said two input of said mixer means being connected to receive said electrical output, a light source oriented so as to couple its output light beam to said chopper means, thereby creating a chopped light beam, a light-sensitive detector means oriented to receive said chopped light beam for developing a signal corresponding to said predetermined rate, and means for connecting the signal from said light-sensitive detector means to a second one of said two inputs of said mixer means.

4. A particle beam detector comprising means for chopping said particle beam at a predetermined rate to produce a spatially modulated particle beam, microphone means having a pressure-sensitive surface that is oriented to intercept said spatially modulated particle beam to produce an electrical output signal at a frequency corresponding to said predetermined rate when a particle beam is present, means for detecting energy present in said electrical output signal at said frequency to provide a visual indication of the presence of said particle beam.

5. A particle beam detector as defined in claim 4 wherein said microphone means includes an electret-condenser type microphone.

6. A particle beam detector as defined in claim 4 wherein said means for detecting includes a mixer means having two inputs and an output, one of said two inputs of said mixer means being connected to receive said electrical output signal, a light source oriented so as to couple its output light beam to said means for chopping thereby creating a chopped light beam, a light-sensitive detector means oriented to receive said chopped light beam for developing a signal corresponding to said predetermined rate, and means for connecting the signal from said light-sensitive detector to a second one of said two inputs of said mixer means.

* * * * *